July 27, 1971 A. G. ROBSON 3,595,728
THERMAL INSULATION
Filed June 16, 1967 13 Sheets-Sheet 13

United States Patent Office 3,595,728
Patented July 27, 1971

3,595,728
THERMAL INSULATION
Arthur Gray Robson, Knutsford, England, assignor to
The Nuclear Power Group Limited, Knutsford, England
Filed June 16, 1967, Ser. No. 646,580
Claims priority, application Great Britain, June 20, 1966,
27,434/66
Int. Cl. B32b 3/06
U.S. Cl. 161—53
9 Claims

ABSTRACT OF THE DISCLOSURE

Thermal insulation formed from sheet members with spacer members separating the sheet members to form interspaces which are sealed from one another by seals formed by pairs of contacting surfaces at least one surface of each pair being of non-metallic, heat resistant material, the permeability of the spacer members and the compressibility of the non-metallic material being such that the spacer members in conjunction with said seals restrict the flow of fluid in and between the interspaces.

---

Figure 1:
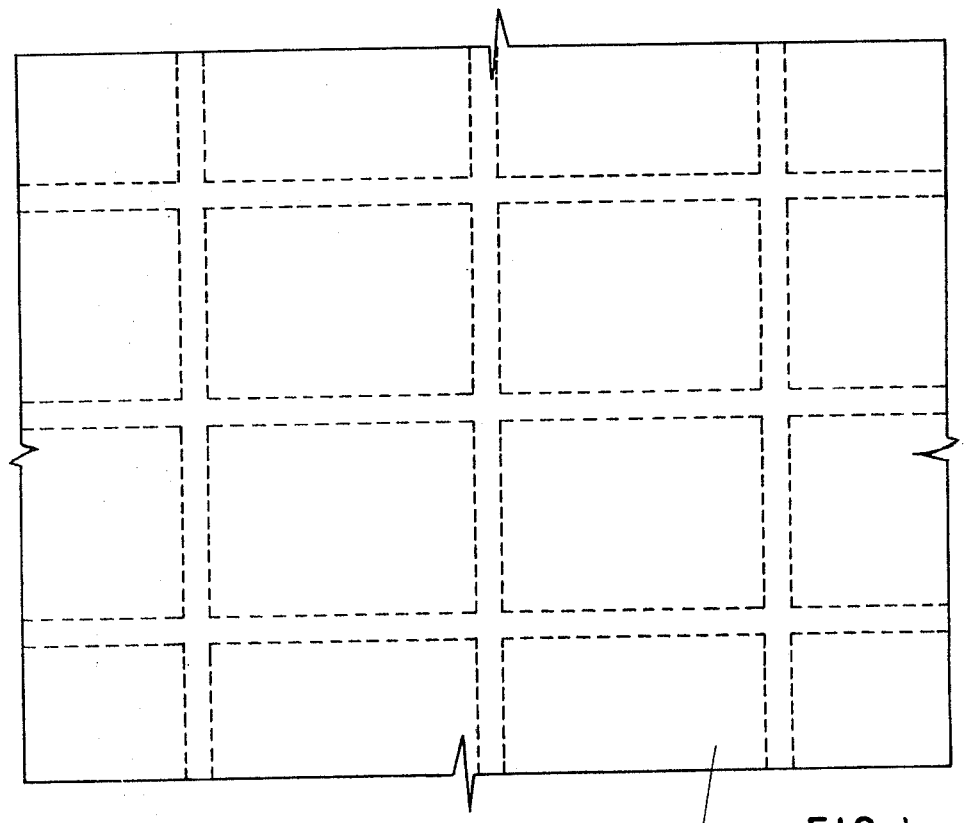

This invention relates to thermal insulation.

In general the insulating property of a material is dependent upon its porosity; metal and other relatively non-porous matreials have high thermal conductivity while porous materials have lower thermal conductivities.

In many industrial processes it is necessary to insulate a structure from a heat source to prevent structural damage or minimise heat loss. Where such structures contain fluids at high pressure and temperature as in the cases of prestressed concrete vessels for nuclear reactors and certain chemical vessels, a common form of insulation consists of thin sheets of metal spaced from one another by protruberances on the sheets or by metal spacers in the form of, for example, wire netting or wire mesh. Practical considerations usually dictate that the fluid has limited access to interspaces in the insulation so that the fluid pressure inside the insulation is close to that inside the vessel.

When the fluid is stationary within the interspaces heat flow therein is by conduction and in general the thermal conductivity is low, but when temperature gradients in the fluid cause density differences, circulation occurs and the heat flow is by convection and the overall thermal conductivity increases. Where the fluid is a compressible fluid such as gas, the heat trannsfer coefficient of convection increases significantly with increase in the pressure and gives rise to an increase in the thermal conductivity of the insulation. It is important therefore to keep fluid flow within the interspaces to a minimum.

To minimise gas movement within the insulation when subjected to gas pressure, it is customary to overlap the metal sheets and to introduce metal-to-metal seals between the sheets. However, due to the flexibility of the thin metal sheets or foil and any geometrical irregularities in the structure to which the insulation is attached, leakage paths can still occur through the seals and the efficiency of the insulation is drastically reduced.

With all-metal insulation therefore it is virtually impossible to prevent or control fluid flow into and out of the sheet interspaces and through leakage paths within the insulation, or restrict convection flow within the sheet interspaces. Other disadvantages are that the all-metal insulation does not easily lend itself to installation and is costly.

An object of the present invention is to provide a thermal insulation having fluid containing interspaces therein but in which interspaces fluid movement is effectively inhibited and the high costs associated with the all-metal insulation are substantially reduced.

According to the present invention there is provided a thermal insulation formed from sheet members with spacer members separating the sheet members to form interspaces which are sealed from one another by seals formed by pairs of contacting surfaces at least one surface of each pair being of non-metallic, heat resistant material, the permeability of the spacer members and the compressibility of the non-metallic material being such that the spacer members in conjunction with said seals restrict the flow of fluid in and between the interspaces.

In one form the insulation consists of sheet members made from metal with the spacer members made from an impermeable or low permeability non-metallic, heat resistant, compressible material. In another form both sheet members and spacer members are of an impermeable or low permeability, compressible, non-metallic, heat resistant material. In yet another form the sheet members are of an impermeable or low permeability, compressible, non-metallic heat resistant material and the spacer members are metallic.

The spacer members may be in the form of strips or sections, or may occupy substantially the whole of the space between adjacent sheet members. The non-metallic spacer members may be of an inorganic mineral, natural or synthetic fibre or any compressible, non-metallic, heat reistant material which is impermeable or of low permeability and capable of forming a good seal. Such a material may consist essentially of a mass of abestos fibres or similar material, unbonded or bonded with a suitable additive or additives to form sheets, blankets, strips, and interlaced structure, sheets perforated with openings or a honeycomb or grid-like structure. If in sheet form, it may have protuberances or ridges formed thereon and may be wire reinforced. Wire reinforcement improves the stability of the sheets and enables the linear coefficient of expansion of the sheets to be increased if required. The non-metallic sheet or spacer members may be metallised on the surfaces, for example, by flame spraying and/or wire reinforced.

Wire mesh may also be interposed between one or more layers of non-metallic sheets interposed between two adjacent plane metal sheets, and when a force is applied to the installation the wires locally compress the non-metallic material to form sealed cells between sheet members or to form restrictions to flow in the interspaces between sheet members.

The metallic sheets may be plane or ribbed, dimpled or corrugated.

The spacer and sheet members may be formed integrally with each other, the spacer members being constituted by protuberances formed integrally with the sheet members during manufacture.

The insulation may be attached to the structure by studs in the wall of the structure and the insulation compressed by tightening nuts on the studs. The insulation may be arranged in a series of adjoining panels, or alternatively arranged in the form of overlayed panels, the joints between adjacent panels in both cases being filled with a compacted fibrous non-metallic compressible material. To ensure that the forces applied by tightening the nuts is transmitted uniformly to the insulation to effect the sealing, cover plates or cover strips can be fitted to the surface of the insulation to cover the joints between the outermost panels. A metallic corrugated or dimpled sheet may be located between the insulation and cover plates or cover strips to provide additional compressibility to compensate for any dimensional inaccuracies in the cover plates and inner face of the structure.

Various embodiments of the invention will now be described with reference to the accompanying drawings in which FIGS. 1 to 22 show in section and in plan view, part of the wall of a structure carrying the thermal insulation in accordance with various embodiments of the invention.

FIGS. 23 to 27 show sections through parts of panels of insulation for various cover plate arrangements.

Figure 2:
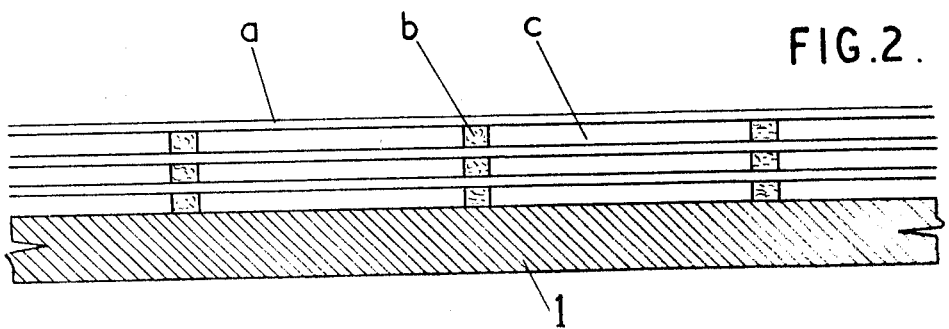

Referring to FIGS. 1 and 2, a wall 1 of a structure such as a prestressed concrete pressure vessel for a nuclear reactor, has attached thereto thermal insulation comprising sheet members a and spacer members b between adjacent sheet members. The sheet members and spacer members form interspaces c which are sealed from one another by seals formed between the sheet members and spacer members. In the form shown, the sheet members a are metallic, for example stainless steel, and the spacer members b are of a non-metallic, low permeability, heat resistant, compressible material, for example compressed asbestos sheet.

The insulation may be attached to the walls by means of studs (not shown) located in the wall of the structure and passing through holes in the insulation. On tightening the nuts on the end of the studs, forces applied by the studs compress the insulation and deform the spacer members b thus ensuring a good seal between spacer members and sheet members. As a result, the obstruction caused by the spacer members because of their low permeability together with the sealed joints formed between the sheet members and spacer members, prevent or minimise fluid flow into and out of the sheet interspaces c.

Figure 3:
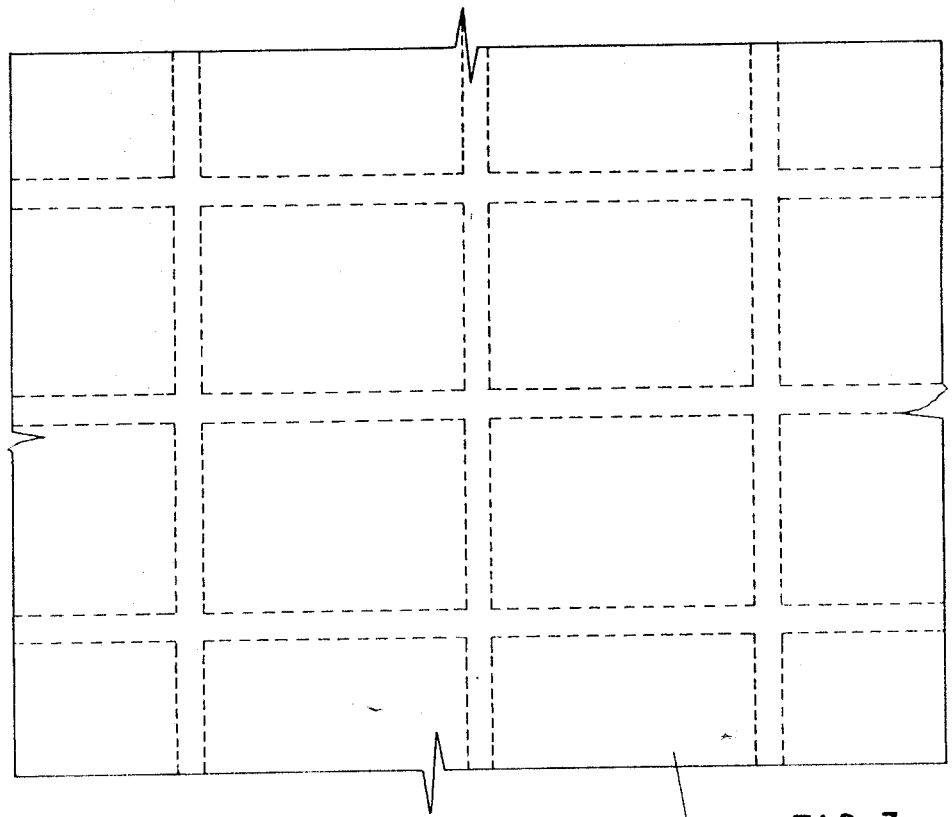
Figure 4:
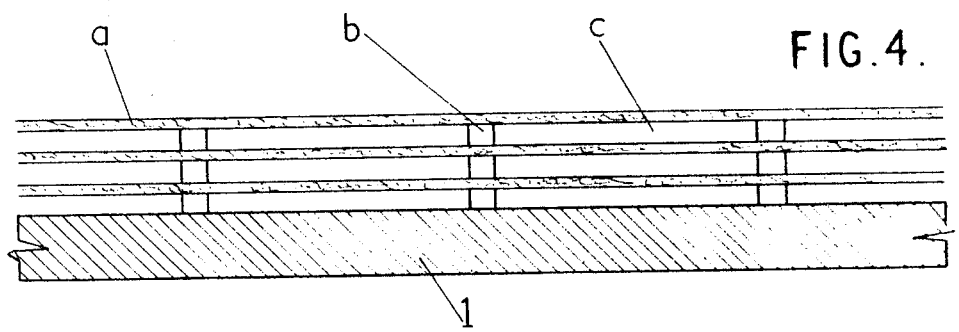

Referring to FIGS. 3 and 4 the sheet members a are of non-metallic, low permeability, compressible, heat resistant material, for example compressed asbestos sheet, and the spacer members b are metallic, for example stainless steel.

As in the case of the insulation shown in FIGS. 1 and 2 the insulation may be attached to the walls by means of studs (not shown) located in the wall of the structure and passing through holes in the insulation. On tightening the nuts on the end of the studs, forces applied by the studs compress the insulation and the metallic spacer members b locally deform the sheet members a thus ensuring a good seal between spacer members and sheet members. The metallic spacer members together with the sealed joints prevent or minimise fluid flow into and out of the sheet interspaces c and the sheet members have low permeability so as to prevent or minimise fluid flow therethrough. In some cases metallised asbestos sheets may be used as sheet members.

As a result of the constructions shown in FIGS. 1-4 leakage of fluid to or from interspaces c between the sheets is substantially reduced and consequently any substantial reduction in thermal insulating properties due to the effect of increased gas pressure within the insulation is avoided.

Figure 5:
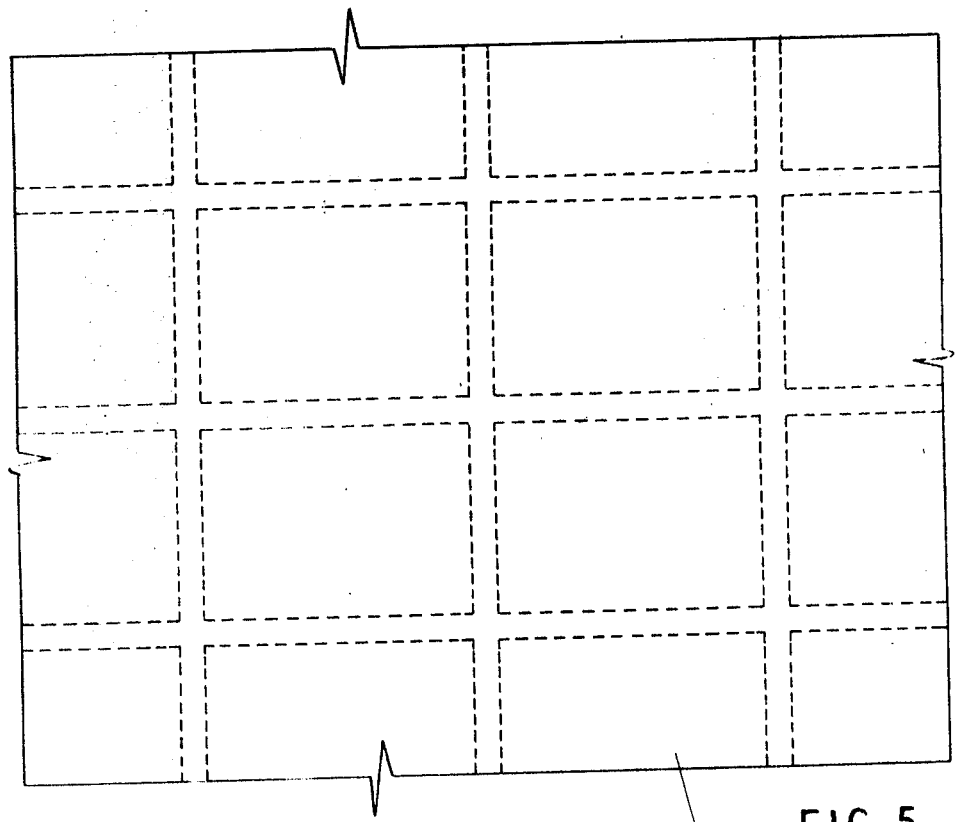
Figure 6:
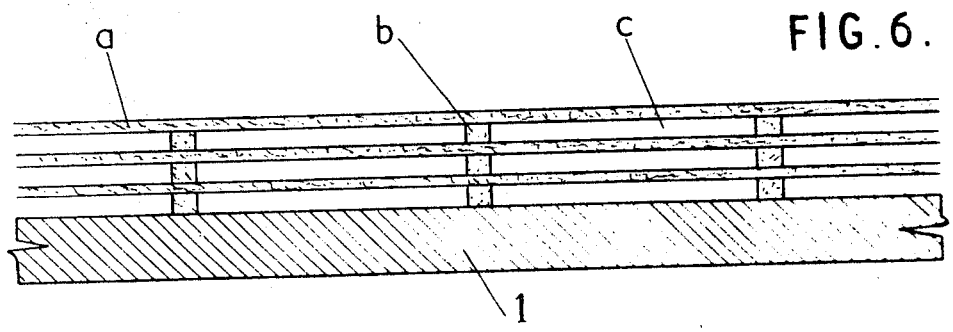

Referring to FIGS. 5 and 6 sheet members a are of non-metallic, low permeability, heat resistant, compressible material, for example compressed asbestos sheet, and the spacer members b are also of non-metallic low permeability compressible material, for example compressed asbestos sheet.

Figure 7:
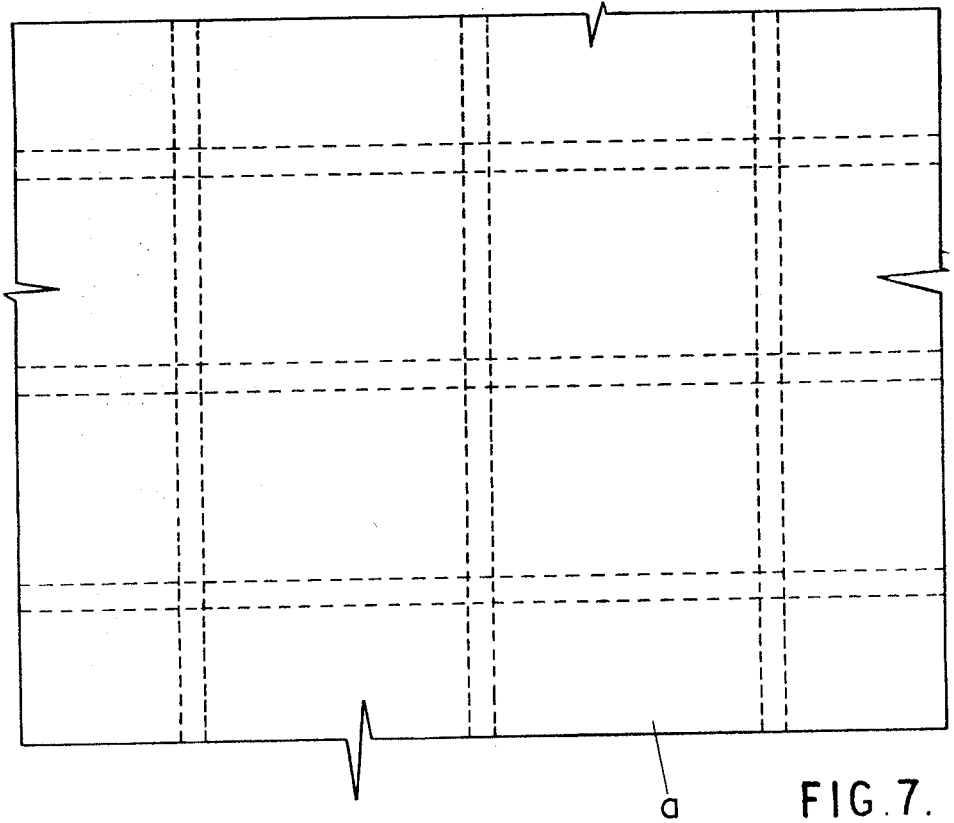
Figure 8:
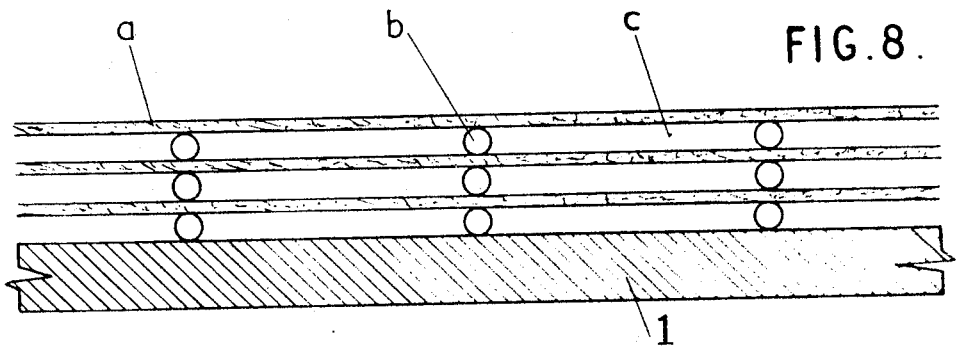

Referring to FIGS. 7 and 8 the sheet members a are of non-metallic low permeability compressible material, for example compressed asbestos sheet. The spacer members b are metallic, for example stainless steel and are in the form of wire mesh or wire netting. The wire mesh may be in its manufactured form or be rolled to flatten the wire at the junctions and provide mesh of constant thickness. The wire mesh defines the interspaces c between sheet members as shown.

A variation on the construction of FIGS. 7 and 8 would be to use metallic sheet members and non-metallic mesh formed for example of braided asbestos or asbestos string or rope.

Figure 9:
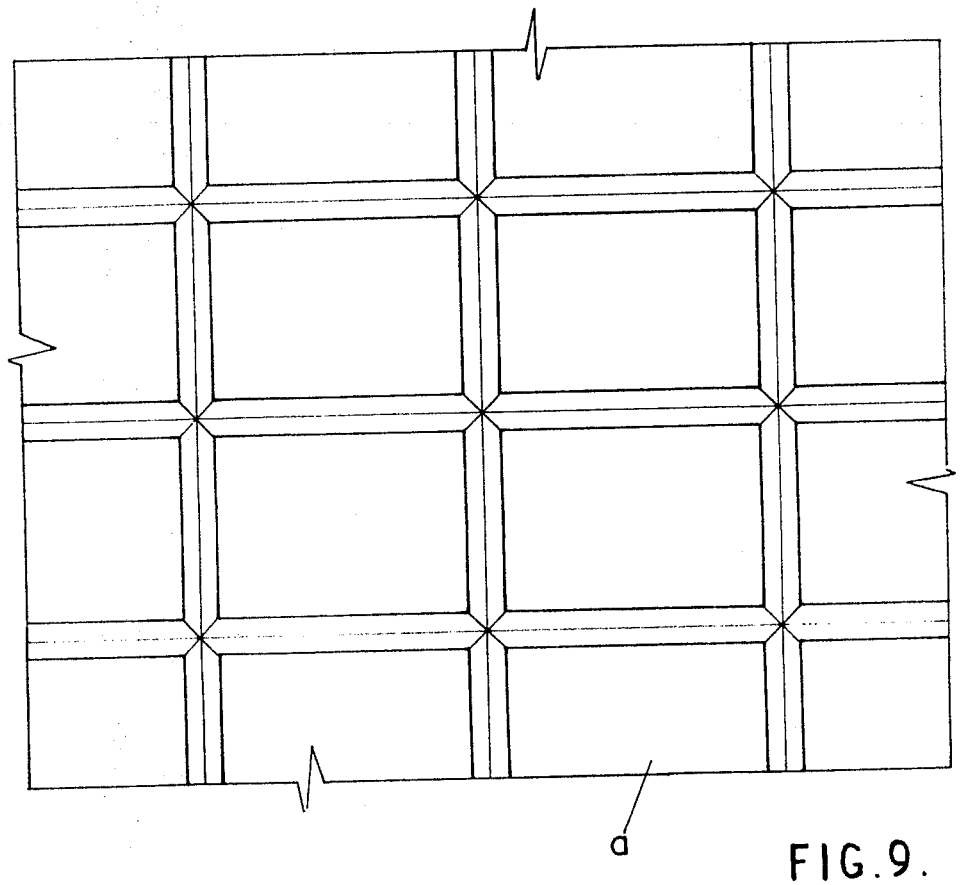
Figure 10:
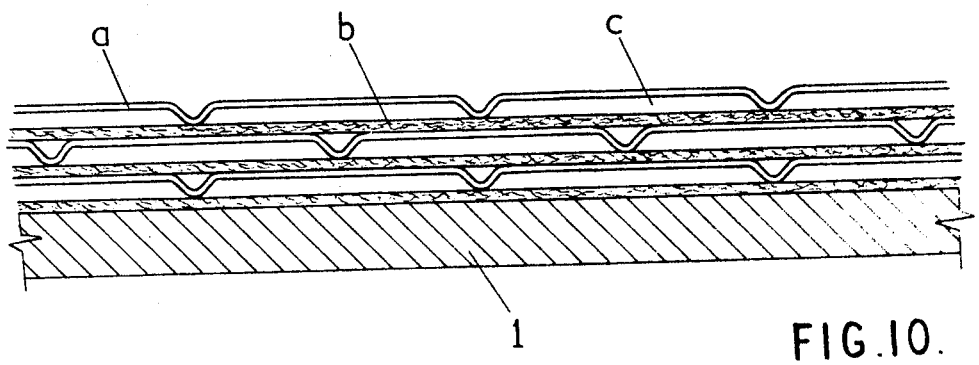

Referring to FIGS. 9 and 10 the sheet members a are metallic, for example stainless steel, and the spacer members b are of a non-metallic, low permeability, compressible material, for example compressed asbestos sheet or cloth. The sheet members are ribbed so that when spacer members are interposed between adjacent sheet members enclosed interspaces c are formed.

As in the case of the insulation shown in FIGS. 1–8 the insulation may be attached to the walls by means of studs (not shown) located in the wall of the structure and passing through holes in the insulation. On tightening the nuts on the end of the studs, forces applied by the studs compress the insulation and locally deform the spacer members b in the region of the ribs thus ensuring a good seal between spacer members and sheet members. As a result, the obstructions caused by the ribs on the sheet members together with the sealed joints, prevent or minimise fluid flow into and out of the sheet interspaces c. Also, if desired, convection within each sealed interspace c can be suppressed by selecting the material, for example bonded asbestos sheet, for the spacer members so that it exfoliates with temperature, and substantially fills the sealed interspaces.

As a result, leakage of fluid to or from interspaces c between the sheets as well as convection within the sealed interspaces is substantially reduced and consequently any substantial reduction in thermal insulating properties due to the effect of increased gas pressure within the insulation is avoided.

Figure 11:
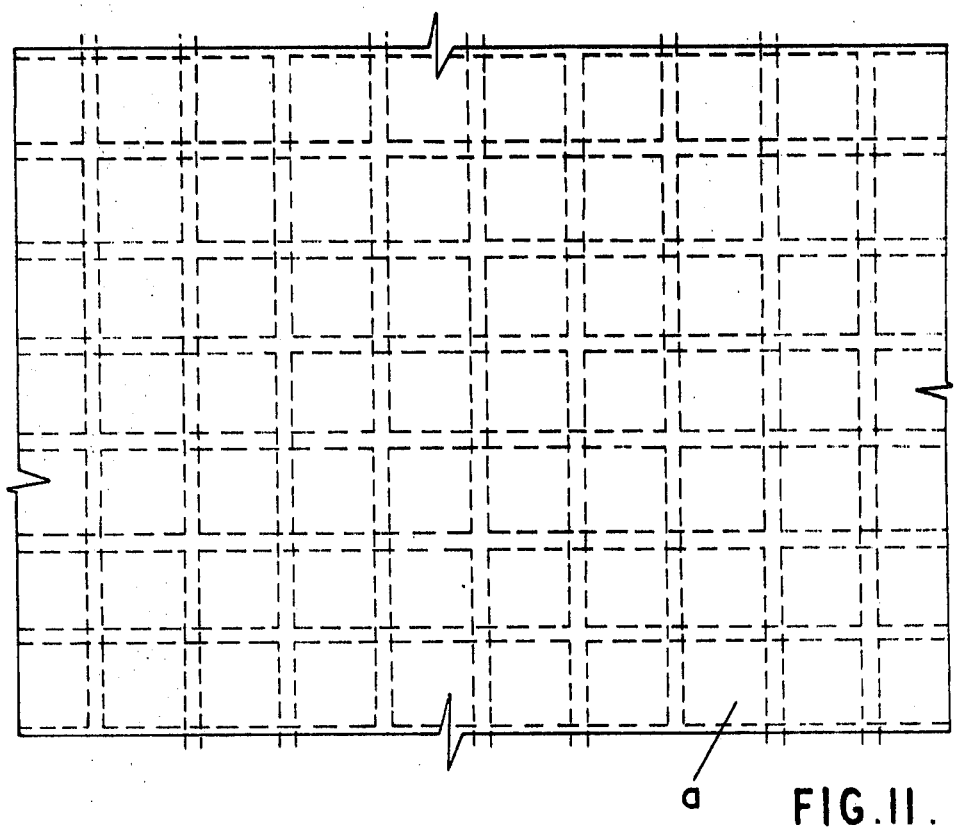
Figure 12:
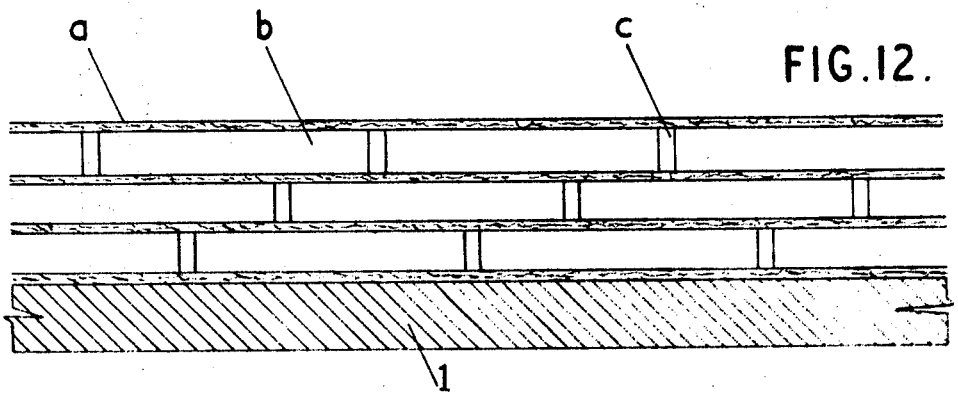

Referring to FIGS. 11 and 12 the sheet members a are a non-metallic, low permeability, heat resistant, compressible material, for example compressed asbestos sheet or cloth, and the spacer members b are of open ended box like structure or may have a grid-like structure. They may be of metal or a non-metallic material of low permeability such as compressed asbestos sheet. In another form they could be bricks of non-metallic material, for example a ceramic. The spacer members may, if desired, be arranged in layers so that in each successive layer the joints are displaced relative to each other in the manner shown.

To prevent or minimise leakage along the edges of the spacer members a fibrous non-metallic material, for example asbestos, may be tamped into the interspaces c between adjacent members in each layer.

Figure 13:
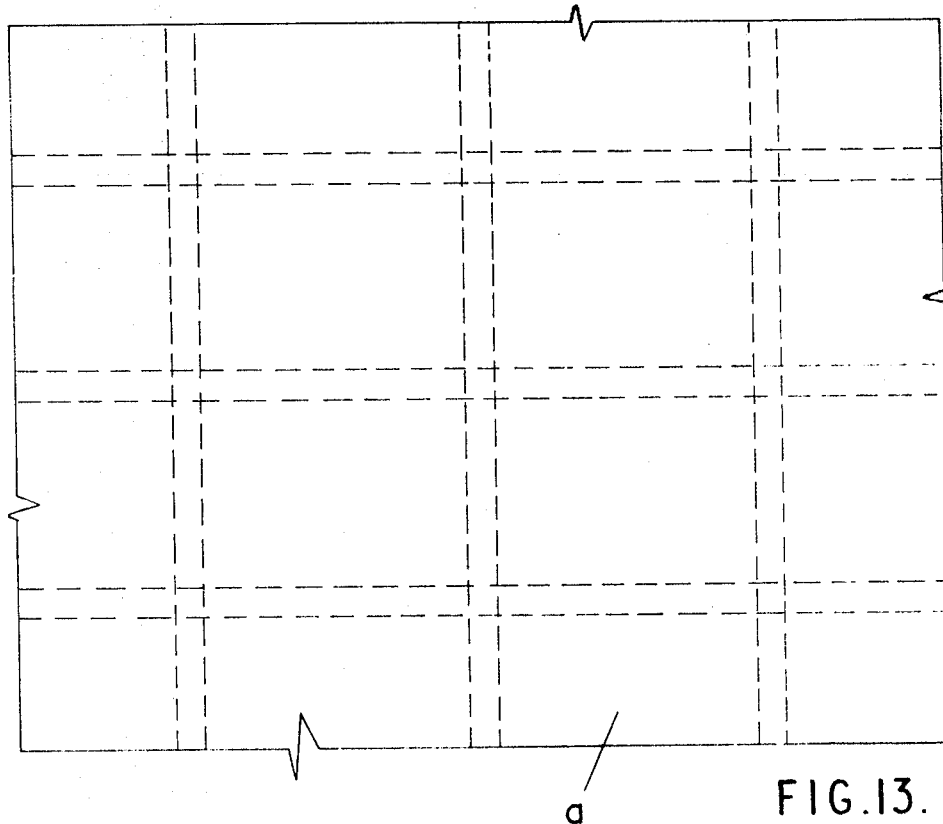
Figure 14:
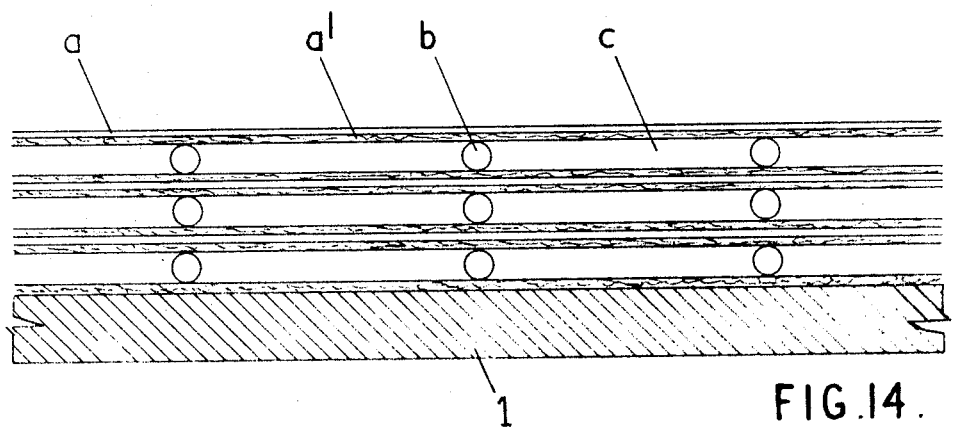

Referring to FIGS. 13 and 14 the sheet members a are metal, for example stainless steel, and interposed between the sheet members a and the spacer members b are further sheet members a' which are of non-metallic, low permeability, heat resistant, compressible material, for example compressed asbestos sheet, fibrous asbestos sheet which substantially fills the interpace, or woven asbestos sheet. The spacer members b are metallic, for example stainless steel. The spacer members may be in the form of wire mesh or wire netting in its manufactured form or rolled to flatten the junctions and give a mesh of constant thickness so that when it is interposed between adjacent non-metallic sheet members a', enclosed interspaces c are formed. Several sheet members a' and spacer members b can be alternated between adjacent sheet members a.

Figure 15:
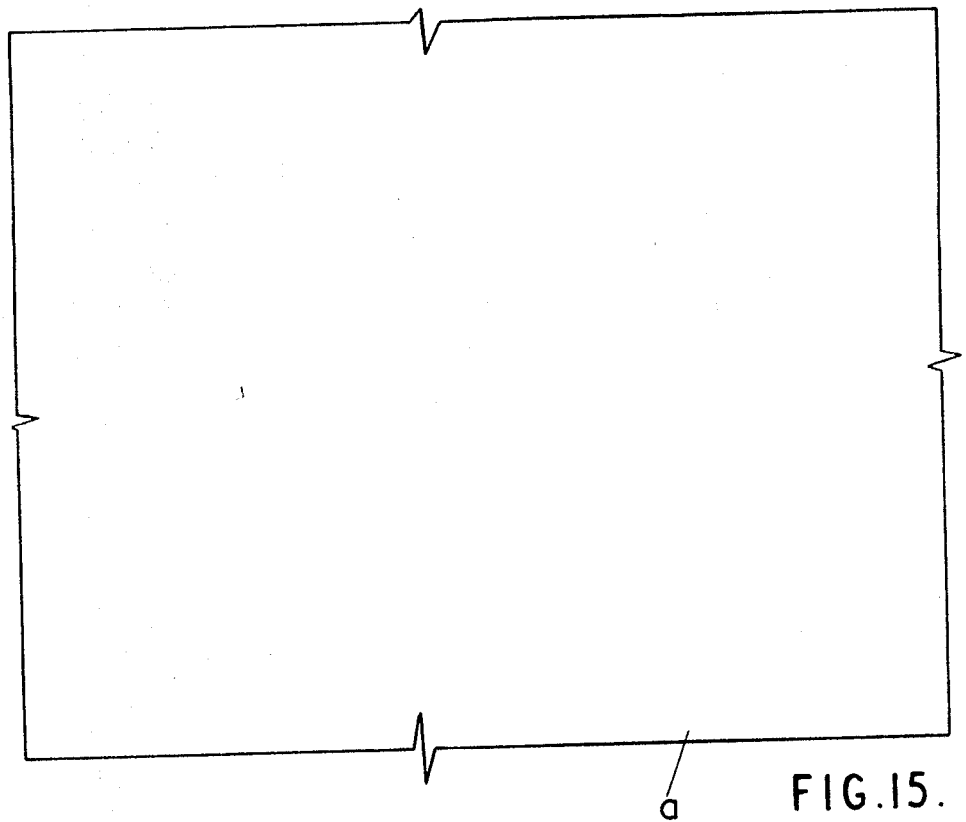
Figure 16:
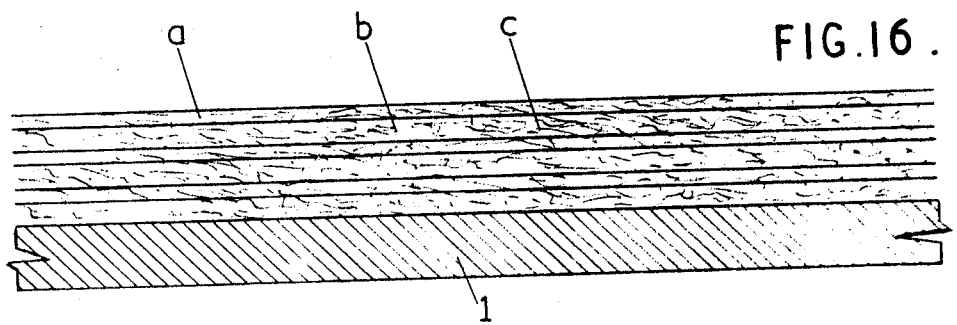

Referring to FIGS. 15 and 16 the sheet members a are of non-metallic low permeability, heat resistant material, for example compressed asbestos sheet, and the spacer members b are of non-metallic, compressible, fibrous material, for example, a bonded or unbonded asbestos fibre. The spacer members which substantially fill the interspaces c between the sheet members, may be in the form of fibrous sheets or blankets. If desired the sheet members a can be metallic, for example of stainless steel. Several spacer members b can be alternated with wire mesh between adjacent sheet members a.

Figure 17:
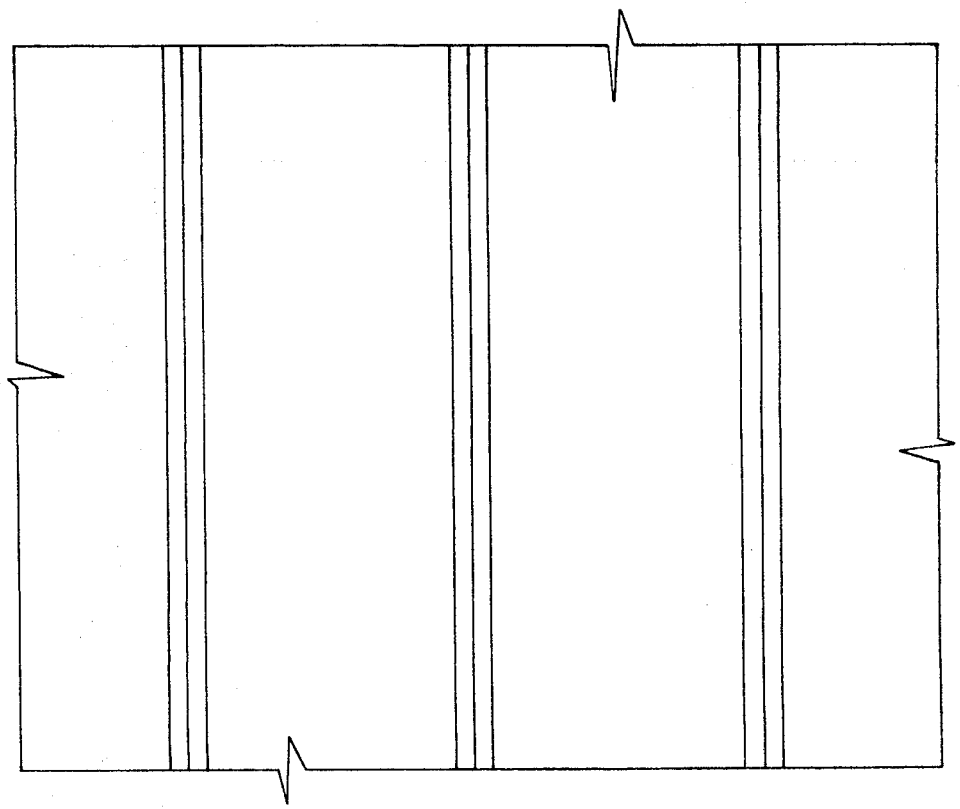
Figure 18:
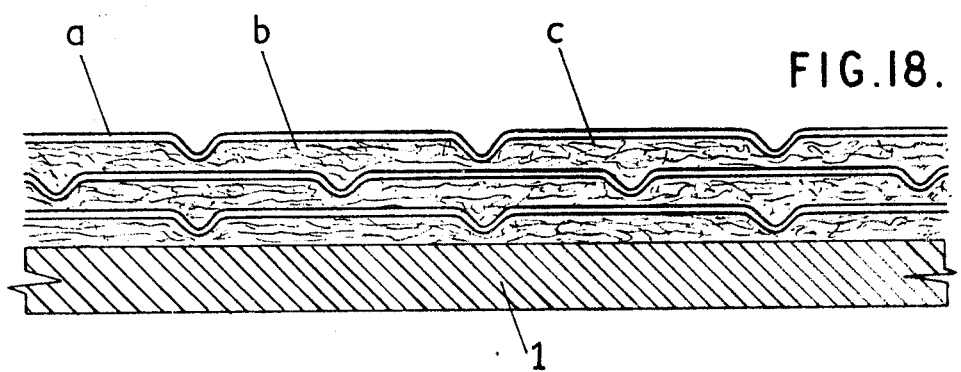

Referring to FIGS. 17 and 18 the sheet members a are metallic, for example stainless steel and are either ribbed, dimpled or corrugated. The spacer members b are a non-metallic, compressible, heat resistant, fibrous material, for example asbestos fibre and substantially fill the interspaces between the sheet members and may be in the form of fibrous sheets or blankets. Whilst in FIG. 17 the ribs are shown as extending in one direction only they could extend in say two mutually perpendicular directions to form a number of separate cells between the sheet members $a$.

The protuberances on the sheet members $a$ serve to control the degree of compaction of the spacer members $b$ and prevent them from slumping when the insulation is attached to vertical walls. The obstruction caused by the spacer members together with the seals formed between the protuberances and the spacer members prevent or minimise fluid flow into and out of the sheet interspaces $c$ as well as convection within the sheet interspaces.

Figure 19:
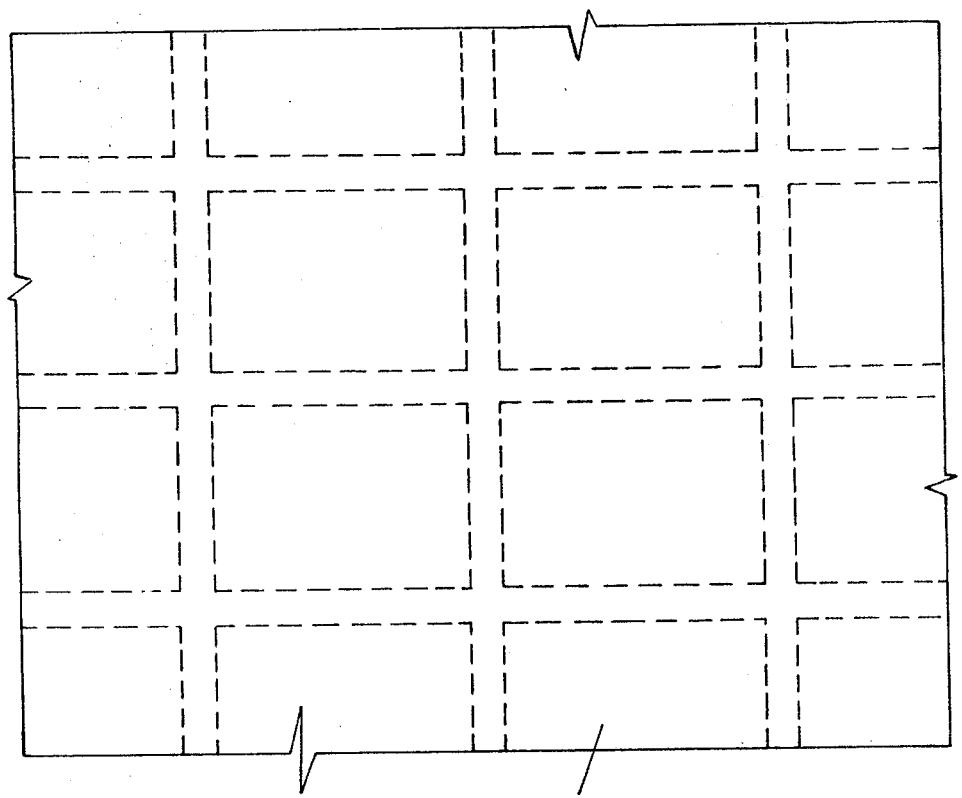
Figure 20:
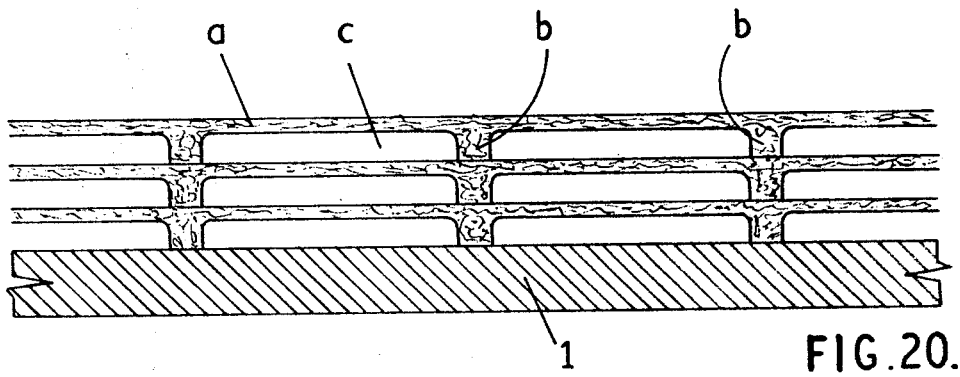

Referring to FIGS. 19 and 20 a wall of the structure 1 has attached thereto thermal insulation consisting of non-metallic, low permeability, compressible (or compressed) asbestos sheet $a$ or like material having ridges or ribs formed thereon which act as spacer members $b$.

Figure 21:
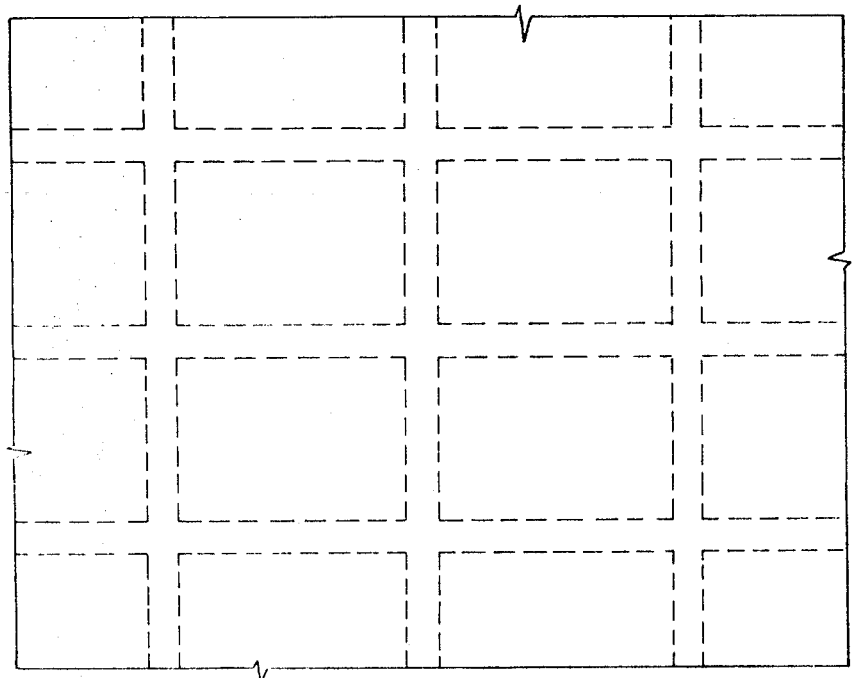
Figure 22:
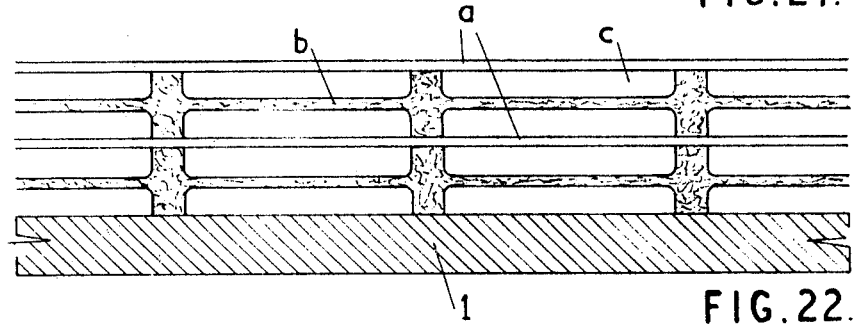

If required a fibrous blanket, for example of asbestos can be interposed between each adjacent sheet-spacer member in the manner described earlier in connection with metal sheet members having ridges or ribs. Whilst in FIG. 20 the ribs or ridges are formed on one side of each sheet member they can be formed on both sides if desired. Such a construction is shown in FIGS. 21 and 22 which show thermal insulation consisting of metallic sheet members $a$ separated by spacer members $b$ in the form of non-metallic, low permeability, heat resistant, compressible sheets of compressed asbestos or like material having ridges or ribs formed on both sides thereof. Instead of using metallic sheet members, non-metallic sheet members of low permeability compressible asbestos sheet may be used. As in the arrangement of FIGS. 19 and 20 a fibrous blanket of asbestos can be interposed between adjacent sheet members and spacer members.

In some structures such as concrete pressure vessels for nuclear reactors, the surface area to insulate is large and the insulation may be arranged in a series of adjoining panels. Alternatively the insulation may be arranged in the form of overlayed panels instead of in the form of single panels, the joints between adjacent panels in both cases being filled with a compacted fibrous non-metallic compressible material.

Figure 23:
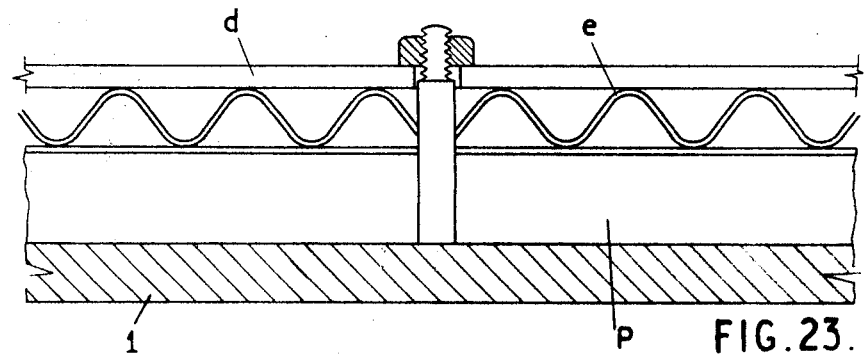
Figure 24:
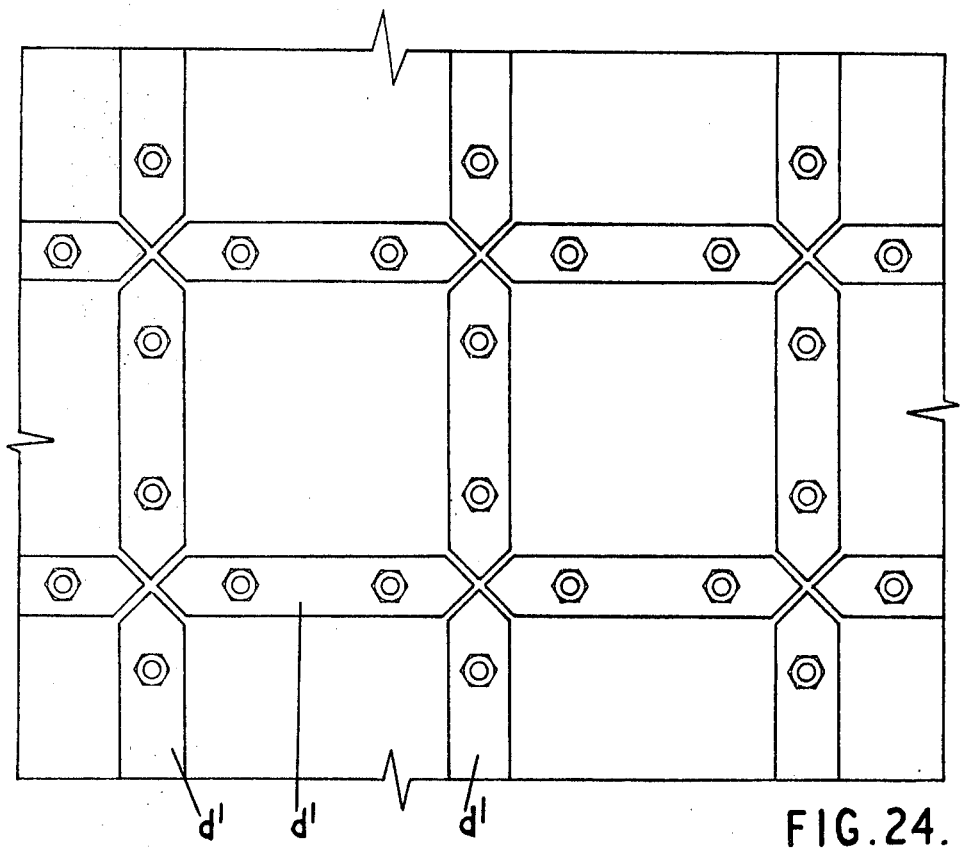
Figure 25:
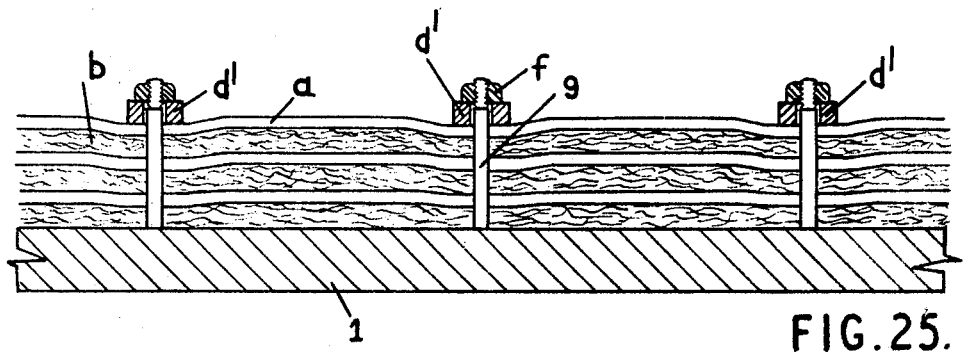

All the form of insulation described can be attached to the wall of the vessel by studs (not shown) located in the wall of the structure and to ensure that the forces applied by tightening nuts on the studs is transmitted over the surface of the insulation metallic or non-metallic cover plates can be fitted to the surface of the insulation. FIG. 23 shows part of a panel P of insulation with cover plate $d$.

The joints in the cover plates $d$ may, if necessary, be displaced relative to the joints between the panels P of insulation immediately adjacent to the cover plates. A flexible member, for example, a dimpled metal sheet $e$ may be interposed between the cover plate $d$ and the insulation panel P or can be located within the insulation, itself to give additional compressibility and distribute the force more evenly across the insulation surface.

Figure 26:
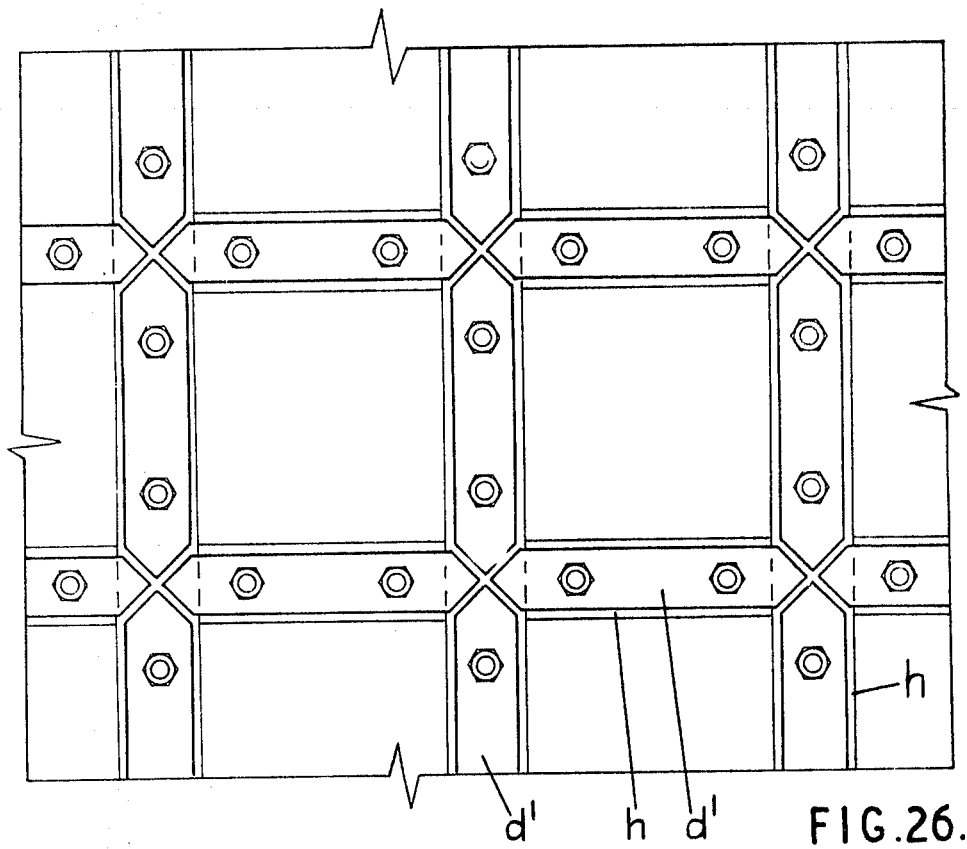
Figure 27:
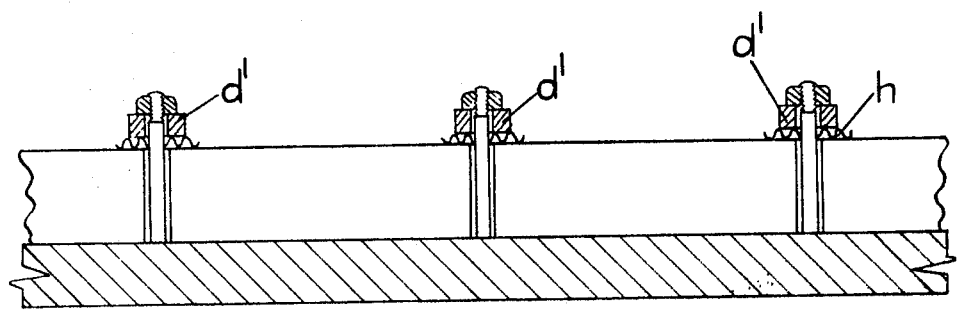

Instead of using cover plates which cover substantially the whole of the surface area of the insulation, cover plates in strip form may be used. Such cover plates would cover only the joints between panels. Cover plates of strip form are shown at $d'$ in FIGS. 24 and 25. Compressive forces are applied to the insulation through metal or non-metallic strips $d'$ by tightening the nuts $f$ on the studs $g$ to effect the required sealing. If desired flexible members in the form of a corrugated or dimpled metallic strip may be interposed between the strip members $d'$ and the insulation to give added compressibility as shown in FIGS. 26 and 27 where the flexible members are indicated at $h$.

To prevent dust from the non-metallic sheets or spacer members entering the fluid inside the pressure vessel, fine metal mesh may be placed on the outer face of the insulation either on the inside or outside of the cover plates. Alternatively either fine metal mesh, flexible metallic or non-metallic strips may be located along the joints between adjacent panels or cover plates.

To prevent damage to the insulation due to differential fluid forces when the vessel is being pressurised or depressurised controlled permeability is provided in the insulation. In one form small holes are provided through the sheet members and cover plates or alternatively gaps can be provided in the spacer members or grooves in the sheet members to permit access for the fluid in the vessel to interspaces in the insulation.

By using thermal insulation of the kind described the disadvantages of all-metal insulation when subjected to fluid pressure are avoided. The use of a compressible low permeability material results in low cost, avoidance of metal-to-metal seals, and effective suppression of convection and fluid leakage as the result of improved sealing which increased the efficiency of the insulation. The material is readily cut with hand tools, is light, flexible and heat resistant, is capable of accommodating differences in tolerances and is compatible with most other material.

It is particularly suitable in pressure vessels for nuclear reactors, chemical reaction vessels and process pressure vessels.

I claim:

1. A nuclear reactor pressure vessel having thermal insulation upon its inner wall, said insulation comprising a plurality of sheet members and a plurality of spacer members separating each adjacent pair of sheet members to form interspaces to which fluid from the interior of the vessel has access, the members of at least one of the two pluralities of members being composed of non-metallic material, and means securing the insulation of the said inner wall and compressing the insulation to an extent which is sufficient to restrict the flow of fluid in and between the interspaces and thereby increase the insulation effect to a desired degree, but which permits the restricted flow of fluid between the interspaces and the interior of the vessel to reduce pressure differentials between the interspaces and the interior of the vessel.

2. A nuclear reactor pressure vessel according to claim 1, wherein each sheet member is in the form of a compressible fibrous blanket.

3. A nuclear reactor pressure vessel according to claim 1, wherein each spacer member is in the form of a compressible fibrous blanket.

4. A nuclear reactor pressure vessel according to claim 1, wherein said securing means comprises studs secured to the said inner wall and passing through the insulation and nuts threadedly engaging said studs and exerting compressive forces upon said insulation.

5. A nuclear reactor pressure vessel according to claim 1, wherein said spacer members are formed integrally with at least one of the two adjacent sheet members.

6. A nuclear reactor pressure vessel according to claim 1, wherein the insulation is in the form of a series of adjoining panels, at least the joint between each pair of adjacent panels being covered by a cover plate.

7. A nuclear reactor pressure vessel according to claim 1, wherein the insulation is in the form of overlayed panels.

8. A nuclear reactor pressure vessel as claimed in claim 1, wherein a cover plate is provided on the side of the insulation remote from the inner wall.

9. A nuclear reactor pressure vessel as claimed in claim 8, wherein flexible metallic compressible members are interposed between the cover plate and the insulation.

(References on following page)

References Cited

UNITED STATES PATENTS

| | | | |
|---|---|---|---|
| 2,657,391 | 11/1953 | Crandon | 161—205X |
| 2,662,043 | 12/1953 | Clements | 52—404X |
| 2,746,892 | 5/1956 | Elfving | 161—137X |
| 2,885,743 | 5/1959 | Macormack | 52—407 |
| 2,966,435 | 12/1960 | Kassinger | 161—45X |
| 3,122,883 | 3/1964 | Terner | 161—213X |
| 3,152,033 | 10/1964 | Black et al. | 161—130X |
| 3,236,300 | 2/1966 | Chave et al. | 165—136 |
| 3,354,021 | 11/1967 | Royet | 161—137 |
| 3,421,977 | 1/1969 | Hutchinson et al. | 176—87X |

FOREIGN PATENTS

| | | | |
|---|---|---|---|
| 668,860 | 8/1963 | Canada | 176—87 |

JOHN T. GOOLKASIAN, Primary Examiner

J. C. GIL, Assistant Examiner

U.S. Cl. X.R.

52—247, 249, 407, 410; 161—68, 127; 176—87